United States Patent
Grosch (10) Patent No.: US 11,685,009 B2
(45) Date of Patent: Jun. 27, 2023

(54) METHOD OF MONITORING A CONDITION IN A TOOL HOLDER WITH A MEASURING APPARATUS, AND INTELLIGENT TOOL HOLDER

(71) Applicant: Haimer GmbH, Igenhausen (DE)

(72) Inventor: Thomas Grosch, Darmstadt (DE)

(73) Assignee: Haimer GmbH, Igenhausen (DE)

(*) Notice: Subject to any disclaimer, the term of this patent is extended or adjusted under 35 U.S.C. 154(b) by 0 days.

(21) Appl. No.: 17/451,351

(22) Filed: Oct. 19, 2021

(65) Prior Publication Data

US 2022/0118575 A1  Apr. 21, 2022

(30) Foreign Application Priority Data

Oct. 19, 2020 (DE) ..................... 10 2020 127 510.2

(51) Int. Cl.
*B23Q 17/09* (2006.01)
*G01H 1/00* (2006.01)

(52) U.S. Cl.
CPC ......... *B23Q 17/0976* (2013.01); *G01H 1/003* (2013.01)

(58) Field of Classification Search
None
See application file for complete search history.

(56) References Cited

U.S. PATENT DOCUMENTS

| | | | | |
|---|---|---|---|---|
| 3,809,488 | A * | 5/1974 | Sonderegger | G05B 19/4063 318/566 |
| 4,131,837 | A * | 12/1978 | Whetham | G05B 19/4163 408/11 |
| 5,458,445 | A * | 10/1995 | Bader | B23Q 1/0036 408/141 |
| 10,875,138 | B1 * | 12/2020 | Mann | B23Q 11/1015 |
| 2008/0018061 | A1 * | 1/2008 | Haimer | B23B 31/20125 279/143 |
| 2009/0234369 | A1 * | 9/2009 | Bax | A61B 34/30 606/130 |
| 2019/0061085 | A1 * | 2/2019 | Jung | B23Q 17/0966 |
| 2019/0152011 | A1 * | 5/2019 | Kummari | G06N 20/20 |
| 2019/0160619 | A1 * | 5/2019 | Lin | B23Q 17/0961 |
| 2021/0034032 | A1 * | 2/2021 | Hebenstreit | B23Q 17/2428 |

FOREIGN PATENT DOCUMENTS

WO  WO-0234464 A1 *  5/2002  ........... B23Q 17/003

OTHER PUBLICATIONS

Bleicher, et al., "Using Sensory Tool Holder Data for Optimizing Production Processes", Journal of Machine Engineering, 2018, vol. 18, No. 3, pp. 16-27.

(Continued)

*Primary Examiner* — Raul J Rios Russo
*Assistant Examiner* — Carl F. R. Tchatchouang
(74) *Attorney, Agent, or Firm* — Laurence A. Greenberg; Werner H. Stemer; Ralph E. Locher (57) ABSTRACT

In a method for monitoring an operating behavior of a tool holder, a resultant measurement axis signal is calculated using at least two measurement axis signals of at least two radially oriented measurement axes of a sensor provided in the tool holder. The monitoring is performed using the resultant measurement axis signal or the resultant.

20 Claims, 8 Drawing Sheets

(56) References Cited

OTHER PUBLICATIONS

Schoeghofer, et al., "Using Sensory Tool Holder Data for Optimizing Production Processes", Journal of Machine Engineering, 2019, vol. 19, No. 3, pp. 43-55.

Bleicher, et al., "Method for Determining Edge Chipping in Milling based on Tool Holder Vibration Measurements", CIRP Annals—Manufacturing Technology 69 (2020), pp. 101-104.

Bleicher, et al., "In-Process Control with a Sensory Tool Holder to Avoid Chatter", Journal of Machine Engineering, 2018, vol. 18, No. 3, pp. 16-27.

\* cited by examiner

METHOD OF MONITORING A CONDITION IN A TOOL HOLDER WITH A MEASURING APPARATUS, AND INTELLIGENT TOOL HOLDER

CROSS-REFERENCE TO RELATED APPLICATION

This application claims the priority, under 35 U.S.C. § 119, of German Patent Application DE 10 2020 127 510.2, filed Oct. 19, 2020; the prior application is herewith incorporated by reference in its entirety.

FIELD AND BACKGROUND OF THE INVENTION

The invention relates to a method for monitoring an operating behavior of a tool holder.

Such a method is known for example from "In-Process Control with a Sensory Tool Holder to Avoid Chatter", F. Bleicher, et al., Journal of Machine Engineering, 2018, Vol. 18, No. 3, 16-27, "Using Sensory Tool Holder Data for Optimizing Production Processes", P. Schörghofer, et al., Journal of Machine Engineering, 2019, Vol. 19, No. 3, 43-55, or "Method for Determining Edge Chipping in Milling based on Tool Holder Vibration Measurements", F. Bleicher, et al., CIRP Annals—Manufacturing Technology 69 (2020) 101-104.

The tool holder to be monitored here is designed for rotation about a tool holder axis of rotation (D) defining an axial direction and, at one axial longitudinal end thereof, provides a tool section with a tool-receiving formation for receiving a tool and, at the other axial longitudinal end thereof, a coupling section with a coupling formation for torque-transmitting coupling to a machine spindle of a machine tool.

The tool holder to be monitored has a measuring apparatus for acquiring data relating to the operation of the tool holder. The measuring apparatus is a uniaxial acceleration sensor with a single measurement axis oriented radially with respect to the tool holder axis of rotation (D). The acceleration sensor thus generates a measurement axis signal that is assigned to the radial measurement axis.

The monitoring of the operating behavior in the case of that tool holder, for example an observation of vibrations or an identification of instabilities, such as chatter, in the tool holder, here in the case of a milling operation (here, a milling tool is then received in the tool-receiving formation of the tool holder), is performed such that the measurement axis signal measured by the uniaxial acceleration sensor during the milling operation is analyzed over the course of time or in the frequency spectrum. For example, "abnormal" (for example abrupt) changes in the measurement axis signal of the uniaxial acceleration sensor over the course of time may indicate an instability.

A disadvantage in the case of such monitoring—considered here by way of example—of a milling processing operation by means of such a tool holder with measuring apparatus/acceleration sensor may be that the signals/data output by the measuring apparatus of the tool holder for the processing operation, in particular in the absence of a suitable evaluation method, model the operation of the tool holder, such as the milling process in this case, only inadequately or with low informativeness, whereby the (process) monitoring is also only inadequately possible. In short, the tool holder with measuring apparatus outputs (process) signals/(process) data that can be interpreted with regard to the process only with difficulty.

SUMMARY OF THE INVENTION

It is accordingly an object of the invention to provide a monitoring method which overcomes the above-mentioned disadvantages of the heretofore-known devices and methods of this general type and which provides for a method for monitoring an operating behavior of a tool holder with a measuring apparatus, which method avoids disadvantages from the prior art, in particular refines the prior art such that it is possible to model and monitor an operation and/or an operating behavior or a processing process in or of a tool holder with an improved level of information (i.e., increased informativeness).

With the above and other objects in view there is provided, in accordance with the invention, a method of monitoring an operating behavior of a tool holder, the method which comprises:

providing a tool holder configured for rotation about a tool holder axis of rotation defining an axial direction, the tool holder, at one axial longitudinal end thereof, having a tool section with a tool-receiving formation for receiving a tool and, at another axial longitudinal end thereof, having a coupling section with a coupling formation for a torque-transmitting coupling to a machine spindle of a machine tool, the tool holder further having a measuring apparatus for acquiring data relating to an operation of the tool holder, the measuring apparatus being a sensor with at least two measurement axes that are oriented substantially radially with respect to the tool holder axis of rotation;

outputting by the sensor at least two measurement axis signals associated with the at least two measurement axes;

calculating a resultant R, being a resultant measurement axis signal, using the at least two measurement axis signals; and monitoring the operating behavior of the tool holder using the resultant R.

In other words, objects of the invention are achieved by means of a method for monitoring an operating behavior of a tool holder having the features as claimed. Dependent claims and the following description relate to advantageous refinements of the invention.

Terms such as up, down, front, rear, left or right are to be understood in accordance with conventional understanding unless explicitly defined otherwise. Terms such as radial and axial are to be understood in relation to a tool holder axis of rotation (D) of the tool holder.

The term "substantially" (as understood under current juris prudence) should be understood to mean "to a practically still significant degree." Possible deviations from exactness that are thus implied by this term may arise unintentionally (that is to say without any functional basis) owing to manufacturing or assembly tolerances or the like.

The method for monitoring an operating behavior of a tool holder provides a tool holder which is designed for rotation about a tool holder axis of rotation (D) defining an axial direction.

Furthermore, the tool holder to be monitored provides, at one axial longitudinal end thereof, a tool section with a tool-receiving formation for receiving a tool and, at the other axial longitudinal end thereof, a coupling section with a coupling formation for torque-transmitting coupling to a machine spindle of a machine tool.

Furthermore, it is also the case that the tool holder to be monitored has a measuring apparatus for acquiring data relating to an operation of the tool holder.

Said measuring apparatus is a sensor, in particular an acceleration sensor, with at least two measurement axes (denoted for example by x and y), which two measurement axes (x, y) are oriented substantially radially with respect to the tool holder axis of rotation (D).

It may be expedient if the at least two measurement axes (denoted for example by x and y), which two measurement axes (x, y) are oriented substantially radially with respect to the tool holder axis of rotation (D), are furthermore also oriented orthogonally with respect to one another.

It may furthermore also be expedient here for the at least two measurement axes which are oriented substantially radially with respect to the tool holder axis of rotation (D) to be aligned with orientation features of the tool holder, such as an index notch or drivers in the case of the hollow shaft cone. With sufficiently fast communication (real time) with a machine controller, an assignment of an angle of rotation can thus be possible. A form of phasor representation of vibrations in machine coordinates would thus be possible.

The measuring apparatus may however also comprise other sensor systems that output direction-dependent signals, such as a force, speed or deformation sensor or a travel measuring system.

The invention will be discussed by way of example below using, or on the basis of, an acceleration sensor.

The acceleration sensor outputs at least two measurement axis signals which are assigned to the at least two (radial) measurement axes and which, when evaluated or interpreted or generally processed, as (measurement) data, describe or model the operation of the tool holder, said measurement axis signals for example also being referred to as x and y, corresponding to the measurement axes x and y.

For the sake of simplicity, the terms (measurement) signals, (measurement) values and (measurement) data may also be used synonymously for one another.

In the method for monitoring an operating behavior of a tool holder, it is then the case that, using the at least two measurement axis signals, a resultant measurement axis signal, hereinafter referred to for short merely as "resultant" (R), is calculated—and the monitoring is performed using the resultant.

Here, the resultant measurement axis signal or the resultant of the at least two measurement axis signals may be understood, as is conventional in the field of (mathematical) mechanics, to mean a (vector) sum, this however also applying to any (mathematical calculation) rule that subjects the two measurement axis signals jointly to a mathematical operation, the result of which then constitutes the resultant.

In short, expressed mathematically, R=f(x, y), where f represents the mathematical calculation rule.

The resultant (R) may for example be calculated in accordance with the following rule:

$$R(x_i) = \text{Sqr}(\text{Sum}(x_i^2)) \quad (1)$$

where:

$x_i$ measurement axis signal of the axis i

Sqr square root

Sum sum (1) also vectorial, in particular in the case of non-orthogonally oriented sensors).

The method is based on the realization that, on the one hand, an acceleration sensor designed and arranged in the tool holder in this way—with at least two measurement axes that are oriented substantially radially with respect to the tool holder axis of rotation (D)—is better capable of describing or modelling the operation of the tool holder by way of the (measurement) signals/(measurement) data that it generates—and can thus more informatively describe a processing process carried out using a tool holder (with such a sensor configuration).

On the other hand, it is then also the case that an informative model of the processing process is provided for the first time by the resultant formed using the at least two measurement axis signals.

More reliable analyses and improved predictions, for example abnormal operating states, instabilities, tool breakages or tool wear, are thus possible.

Tests using tool holders equipped with sensors have shown that, in particular, simple uniaxial sensors or tool holders with simple uniaxial sensors can output less informative data relating to processing processes, from which it is thus less reliably possible to identify abnormal operating states, instabilities, tool breakages, tool wear or the like.

Figure 10:
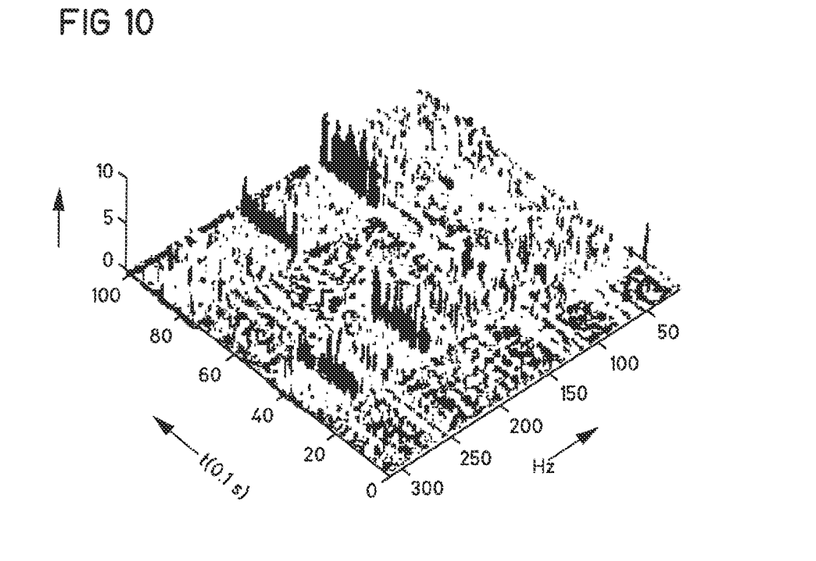
FIG. 10 shows processing/sensor data of a tool holder with a uniaxial acceleration sensor (over the course of time)

FIG. 10 shows, for example, processing/sensor data of a tool holder, in this case an end mill with a number of teeth z=4, using a uniaxial acceleration sensor—with one measurement axis oriented radially (32). The process parameters are n=2400 rpm, $a_P$ (cutting depth)=2 mm and $a_e$ (working engagement)=4 mm.

Here, FIG. 10 shows—in a 3D illustration—a spectral analysis versus the time (spectrogram). Here, the time axis runs from the bottom to the left, and the frequencies increase downward from the right. The expected tooth meshing frequency is 160 Hz. This cannot be seen at first glance from FIG. 10.

Figure 11:
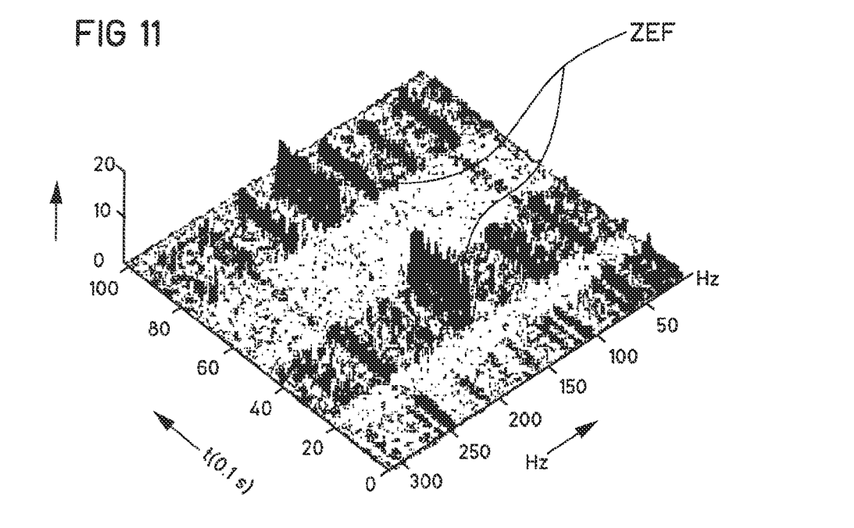
FIG. 11 shows processing/sensor data of a tool holder according to the invention with a biaxial acceleration sensor with two radial measurement axes (spectrogram)

By contrast, FIG. 11 shows processing/sensor data of a tool holder, in this case again the end mill with a number of teeth z=4, with in this case a biaxial acceleration sensor—with two orthogonal measurement axes (x, y) oriented radially (32). The two (measurement/measurement axis) signals x, y or the (measurement) data thereof have been combined to form a resultant $R_{xy}$ in accordance with the rule $$R(x_i) = \text{Sqr}(\text{Sum}(x_i^2)) \quad (1)$$

where:

xi measurement axis signal of the axis i

Sqr square root

Sum sum

The process parameters are again n=2400 rpm, $a_P$ (cutting depth)=2 mm and $a_e$ (working engagement)=4 mm.

FIG. 11 again shows—in a 3D illustration—the spectral analysis versus the time. Here, the time axis again runs from the bottom to the left, and the frequencies again increase downward from the right. The expected tooth meshing frequency is again 160 Hz—and can this time be clearly identified as the dominant frequency in FIG. 11 (denoted by ZEF).

It can thus be seen that the at least biaxial acceleration sensor in combination with the resultant formed from its measurement signals are capable of modelling or describing an operating behavior of a tool holder, whereby abnormal operating states, instabilities, tool breakages, tool wear or the like in the tool holder can be reliably identified.

It is expedient if the acceleration sensor also has a third measurement axis, for example denoted as z (wherein corresponding (measurement axis) signals/values/data may also be denoted by z), the third measurement axis being oriented substantially axially with respect to the tool holder axis of rotation (D), the acceleration sensor thus also outputting a third measurement axis signal (z) assigned to the third measurement axis, and in particular the resultant (R) possibly being calculable also using the third measurement axis signal.

The third measurement axis signal (z) may however possibly also be evaluated separately, because the third measurement axis or z axis may behave somewhat differently (because it is stimulated differently) than the first measurement axes or x and y axis, because the main stimulation takes place in the measurement plane thereof.

Here, from cutting force tests with multi-component dynamometers, it is already known that axial axis signals exhibit significant signal variations in the presence of instabilities.

If the third measurement axis or z axis is stimulated differently, it may if appropriate be taken into consideration for the detection of chatter, for example, because in the case of force measurement platforms, too, this axis exhibits very intense step changes in force in the presence of chatter.

Provision may furthermore be made for unprocessed or processed measurement axis signals and/or data to be transmitted wirelessly to an evaluation unit, in particular to a condition monitoring system (CMS). This may for example be performed in accordance with known (radio) standards and/or by means of Bluetooth.

It is furthermore expedient if unprocessed or processed measurement axis signals and/or data are statistically processed, in particular smoothed, filtered or subjected to a frequency analysis.

Provision may also be made for unprocessed or processed measurement axis signals and/or data to be subjected to a transformation, in particular a coordinate transformation from a rotating system, for example a coordinate system which co-rotates with the tool holder and which is spanned by the measurement axes, into an inertial system.

It is particularly expedient if the acceleration sensor is arranged in the tool holder axis of rotation (D) or close to the tool holder axis of rotation (D). The positioning of the acceleration sensor has the influence that a base load $a_{zp}$ (centripetal acceleration) varies with the square of the rotational speed n, and the spacing of the acceleration sensor to the tool holder axis of rotation (D) should therefore be kept as small as possible for monitoring of high rotational speeds. In this way, the measurement range of the acceleration sensor is only insignificantly restricted.

The rotational-speed-dependent influence on the measurement result is reflected in the time signal by a shift of the amplitude with the magnitude of the base load $a_{zp}$. This must be observed if the vibration intensity in the time signal is taken into consideration for an evaluation. The measured maximum value then does not correspond to the stimulation by the process, but is informative only after the shift has been subtracted.

With suitable calibration of the measurement system, it is even possible to identify an eccentricity of the tool that has been clamped into the machine spindle, through analysis of the base load $a_{zp}$.

Provision may preferably also be made for process and/or operating parameters of a machine tool that is in a processing process/operation with the tool holder to be automatically adapted and/or varied in a manner dependent on the monitoring. Expressed figuratively and in simplified terms, it is expedient for the processing process to be controlled in open-loop and/or closed-loop fashion using the monitoring result. For example, if the monitoring result indicates chatter, then the rotational speed of the machine tool can be varied, or at the first sign of an impending tool breakage, the machine tool can be shut down in controlled fashion.

It is furthermore expedient if, aside from the acceleration sensor, the tool holder has further electronics components, in particular a microcontroller, one or more transmission devices, in particular one or more antennae, one or more circuit boards and/or one or more energy supplies.

In one refinement, provision is made for the tool-receiving formation to be a shrink chuck or a hydraulic expansion chuck or a face mill arbor or a collet chuck or a power chuck.

The coupling formation may for example also be or comprise a hollow shaft cone or a steep-angle taper and/or an engagement formation for a ball-type clamping system or a polygonal hollow shaft.

The method can preferably be used for identifying an abnormal operating/process state, in particular an instability and/or chatter and/or wear and/or breakage in a/of a tool received in the tool holder, with the identification being performed by way of an analysis using the resultant.

The method may also be used for automatic machine tool control, with process and/or operating parameters of the machine tool that is in a processing process/operation with the tool holder being automatically adapted and/or varied in a manner dependent on the monitoring.

With the above and other objects in view there is also provided, in accordance with the invention, an intelligent ("smart") tool holder—having at least one tool holder which is designed for rotation about a tool holder axis of rotation (D) defining an axial direction and which, at one axial longitudinal end thereof, has a tool section with a tool-receiving formation for receiving a tool and, at the other axial longitudinal end thereof, has a coupling section with a coupling formation for torque-transmitting coupling to a machine spindle of a machine tool and which has a measuring apparatus for acquiring data relating to operation of the tool holder, which measuring apparatus is an acceleration sensor with at least two measurement axes, which two measurement axes are oriented substantially radially with respect to the tool holder axis of rotation (D), which sensor outputs at least two measurement axis signals assigned to the at least two measurement axes, and having an evaluation unit, for example a CMS, which is configured to carry out the method or one of its refinements.

In short, an intelligent tool holder of said type provides the tool holder provided according to the method (or a refined tool holder) and an evaluation unit that carries out the method (or one of its refinements).

In a refinement, the acceleration sensor may be designed in a variety of ways. For example, in one refinement, provision may be made for the acceleration sensor to have (exactly) two measurement axes, which are in particular oriented orthogonally with respect to one another. In another refinement, the acceleration sensor may also have three measurement axes, which in this case in particular span an orthogonal coordinate system, wherein—in this case—the third measurement axis may be oriented substantially axially with respect to the tool holder axis of rotation (D).

It is also expedient if the resultant (R) is calculated by means of an evaluation unit, for example a microprocessor/microcontroller, or is calculated in the course of condition monitoring (CM) or in a condition monitoring system (CMS).

Furthermore, provision may also be made for the acceleration sensor to be arranged on a separate circuit board, in particular on a different circuit board than the microcontroller. In this way, it is possible to realize more flexible arrangements of the components—also as advantageous modular structural systems (with flexible exchangeability)—in the tool holder.

Here, the circuit board that bears the microcontroller may be configured as a flexible circuit board, which can thus give rise to an expedient installation situation in the tool holder.

The one or more transmission devices or antennae may also be arranged on one or more separate circuit boards.

Such distributed arrangements thus allow an advantageous modular construction in the tool holder with simplified exchangeability.

It may however also be expedient for major components to be combined in one electronic structural unit, for example a sensor/μC combination, on one chip.

The antenna may expediently be an SMD (surface mounted device) antenna or a wire antenna or a self-adhesive foil antenna. Provision may also be made here for the SMD antenna or the wire antenna to be arranged on a separate circuit board (modular construction/modular system).

Provision may furthermore also be made for a transmission device, in particular antenna, and/or an energy supply to be arranged in recessed fashion in a depression on an outer surface of the tool holder.

Such a depression may expediently be formed as a circular pocket on the outer surface of the tool holder, which depression is in particular potted, in particular using a silicone compound, and/or covered.

In one refinement, two or more transmission devices, in particular two or more antennae, in particular wire antennae, are provided, which are in particular arranged so as to be distributed in a circumferential direction about the tool holder axis of rotation (D). For example, if one of the two or more antennae is situated in a transmission shadow, the other antenna(e) can (redundantly) transmit data. Uninterrupted data transmission can thus be ensured.

Furthermore, provision may also be made for one or more connection bores to run obliquely with respect to the tool holder axis of rotation (D), in particular such that a connection bore for a connection line of the acceleration sensor or of an antenna runs obliquely with respect to the tool holder axis of rotation (D). Oblique bores with cable guides in this regard assist in avoiding cable kinking, and thus make the systems more fail-safe.

In one refinement, provision is also made for the acceleration sensor to have an SPI interface and/or for electronics in the tool holder to have SPI interfaces and/or an SPI bus. In short, it is preferable in the method for values/data/signals to be transmitted via an SPI interface. SPI interfaces or an SPI bus allow high data rates, for example higher than I²C interfaces.

Furthermore, it may also be expedient for an energy supply to be realized by means of, in particular kinetic, energy harvesting, with in particular a coolant flow in the tool holder being used for generating energy, in particular by means of a turbine in a coolant channel in the tool holder.

Alternatively or in addition, energy supplies can be provided by means of batteries and/or storage batteries.

In particular, it is expedient if a machine tool is equipped with a method according to the invention with tool holders according to the invention, or with methods and/or tool holders refined as described above. It is thus possible for processes to be monitored on the machine tool.

The above description of the invention and of advantageous configurations of the invention contain numerous features that are depicted individually and in some cases together in combination in the individual (main/dependent) claims. These features may however expediently also be considered individually for a/the tool holder and/or combined to form further meaningful combinations.

Even if some terms have been used in each case in the singular or in conjunction with a numeral in the description or in the patent claims, the scope of the invention is not intended to be restricted to the singular or to the respective numeral for said terms. Furthermore, the words "a" or "an" are to be understood not as numerals but as indefinite articles.

The above-described characteristics, features and advantages of the invention, and the manner in which these are achieved, will become clearer and more distinctly understandable in conjunction with the following description of the exemplary embodiments of the invention, which will be discussed in more detail in conjunction with the drawings/figures (identical parts/components and functions are denoted by the same reference designations in the drawings/figures).

The exemplary embodiments serve for the explanation of the invention and do not restrict the invention to the combinations of features, including functional features, specified therein. Furthermore, for this purpose, suitable features of each exemplary embodiment may also explicitly be considered in isolation, taken from one exemplary embodiment, introduced into another exemplary embodiment in order to supplement the latter, and combined with any of the claims.

Other features which are considered as characteristic for the invention are set forth in the appended claims.

Although the invention is illustrated and described herein as embodied in condition monitoring in a tool holder with measuring apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The first part of the following description deals with a method of condition monitoring by means of sensor-equipped tool holder, namely, the tool holder 1 with sensor arrangement as illustrated in FIGS. 1-8.

Referring now to the figures of the drawing in detail and first, in particular, to FIG. 1 thereof, there is shown a first embodiment of a tool holder 1 according to the invention, hereinafter referred to for short merely as tool holder 1 or first tool holder 1.

The tool holder 1 comprises a tool holder main body 35, which will hereinafter be referred to merely as main body 35. In order to achieve the greatest possible stiffness, the main body 35 is in this case of single-piece form. The main body is produced in the conventional manner from metal.

In the context of the present invention, a single-piece configuration is also present if a component is generated in an additive process, for example from metal powder, or is assembled from multiple components in non-detachable fashion, for example by welding or brazing.

The tool holder 1, which extends (axially 31) along a tool holder axis of rotation D, hereinafter referred to merely as axis of rotation D, has a tool section 3 at its tool-side longitudinal end 2 and has a coupling section 6 at its opposite, coupling-side longitudinal end 5.

The tool section 3 comprises a tool-receiving formation 4 in the form of a tool-receiving recess 4. A shaft of a tool (not illustrated in FIG. 1) can be axially 31 inserted into said tool-receiving recess 4 from the tool-side longitudinal end 2.

The tool section 3 of the tool holder 1 is designed, in a manner known per se, as a shrink chuck, in which a shaft of a tool (not illustrated in FIG. 1) can be clamped utilizing the thermal expansion and shrinkage of the material of the main body.

Figure 1:
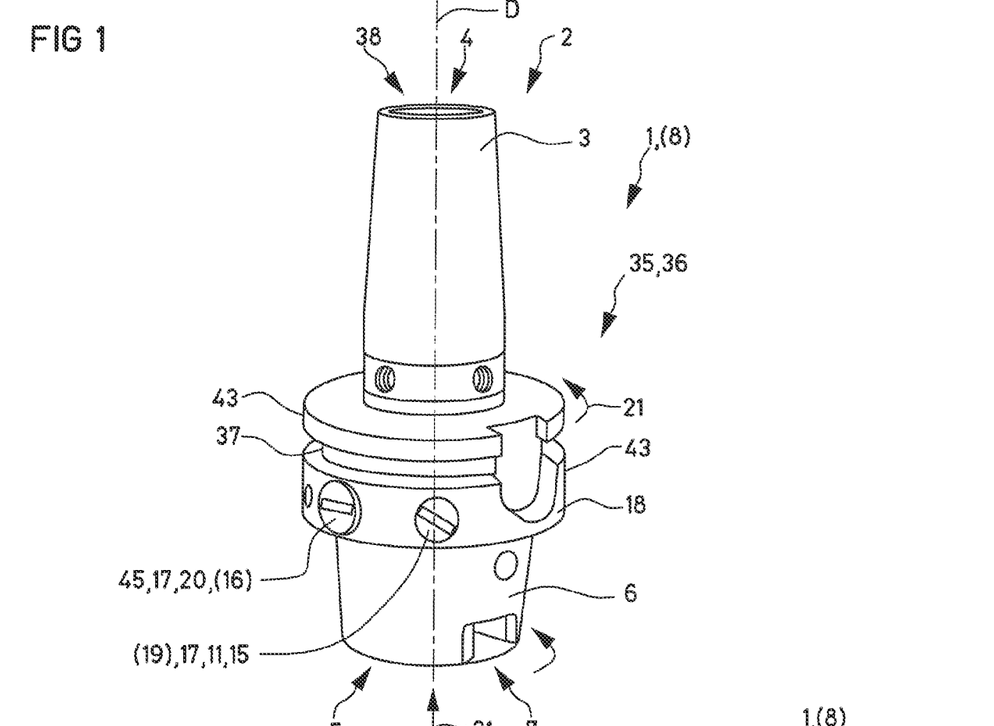
FIG. 1 shows a tool holder with clamping chuck (in this case a shrink chuck) according to one embodiment.

In the example of a tool holder 1 shown in FIG. 1, the coupling section 6 comprises a coupling formation 7 in the form of a hollow shaft cone, referred to for short as HSC.

As can be seen from further exemplary embodiments which are not shown, the tool section 3 may also be designed in accordance with some other clamping principle, such as that of a hydraulic expansion chuck. Independently of this, it is likewise possible for the coupling section 6 to be configured with some other shaft design.

Axially 31 between the tool section 3 and the coupling section 6, there may be provided a handling formation 36 for the handling of the tool holder 1, for example by a gripper apparatus. As illustrated in FIG. 1, the handling formation 36 may comprise a gripper channel 37 which encircles the axis of rotation D in the circumferential direction 21.

In the example shown in FIG. 1, a central recess 38 extends axially 31 all the way through the main body 35, of which central recess 38 the tool-receiving recess 4 forms an axial section which can serve inter alia for the supply of coolant through the tool holder 1 to the processing location, at which processing location the tool (not illustrated) that is clamped in the tool holder 1 is in processing engagement with a workpiece to be processed, for example milling processing in the case of a milling tool.

For the monitoring of the operation of the tool holder 1 during the workpiece processing, the tool holder 1 is equipped with a measuring apparatus 8.

Said measuring apparatus 8 also makes it possible to identify, for example, abnormal states, such as tool breakages/wear, vibrations or other instabilities, for example chatter, in the tool holder 1. For this purpose, signals/data of the measuring apparatus are analyzed and evaluated/processed.

For this purpose, the measuring apparatus 8 provides various components which are arranged on the tool holder 1 and which are connected to one another (via cables), such as an acceleration sensor 9, an SMD antenna 11, a microcontroller (µC) 10 and a voltage/energy supply or battery 16 (cf. in particular FIGS. 2 to 8), which components are normally located, in accordance with a modular construction, as described below, on separate boards 12, 13, 14, 15 which are connected to one another via connection lines/cables 23 (not illustrated), 24, 25, such as a main board 14 with microcontroller (µC) 10, a (sensor) board 13 with acceleration sensor 9, and an (antenna) board 15 with SMD antenna 11.

Biaxial Acceleration Sensor 9

Figure 6:
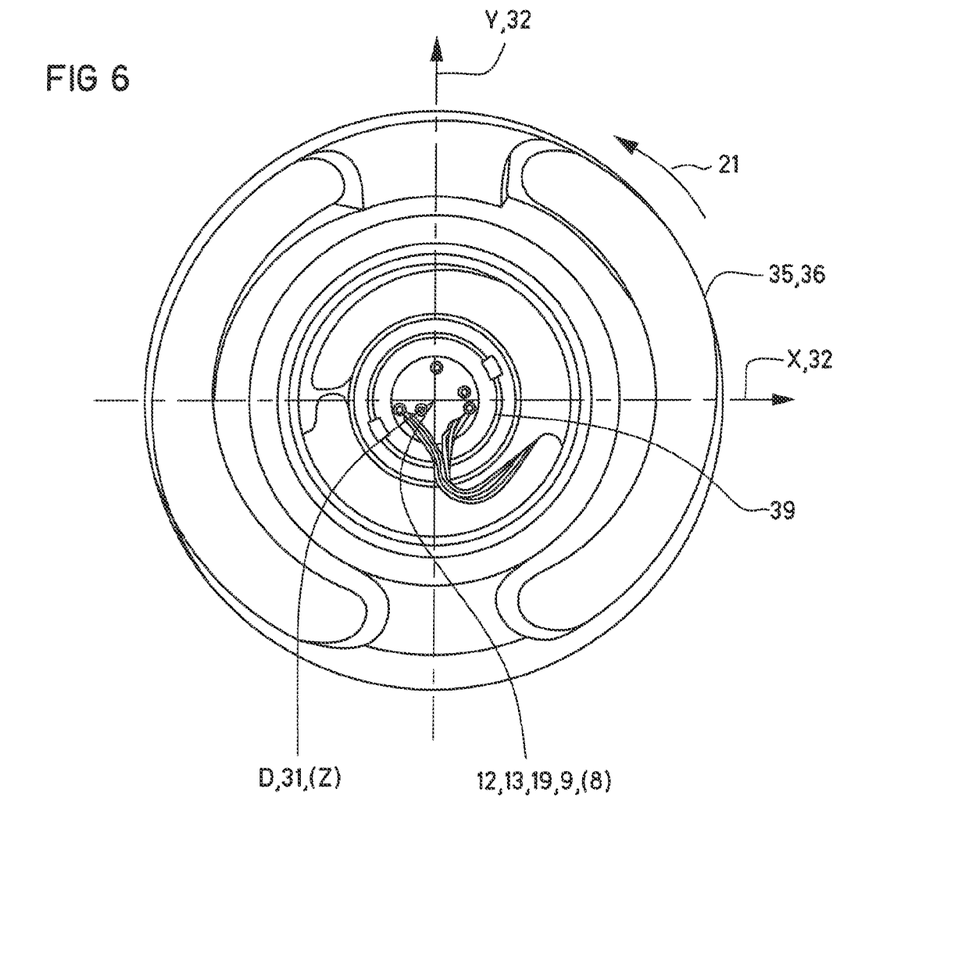
FIG. 6 shows a view of the tool holder as per FIG. 1 with a position of the sensor.
Figure 7:
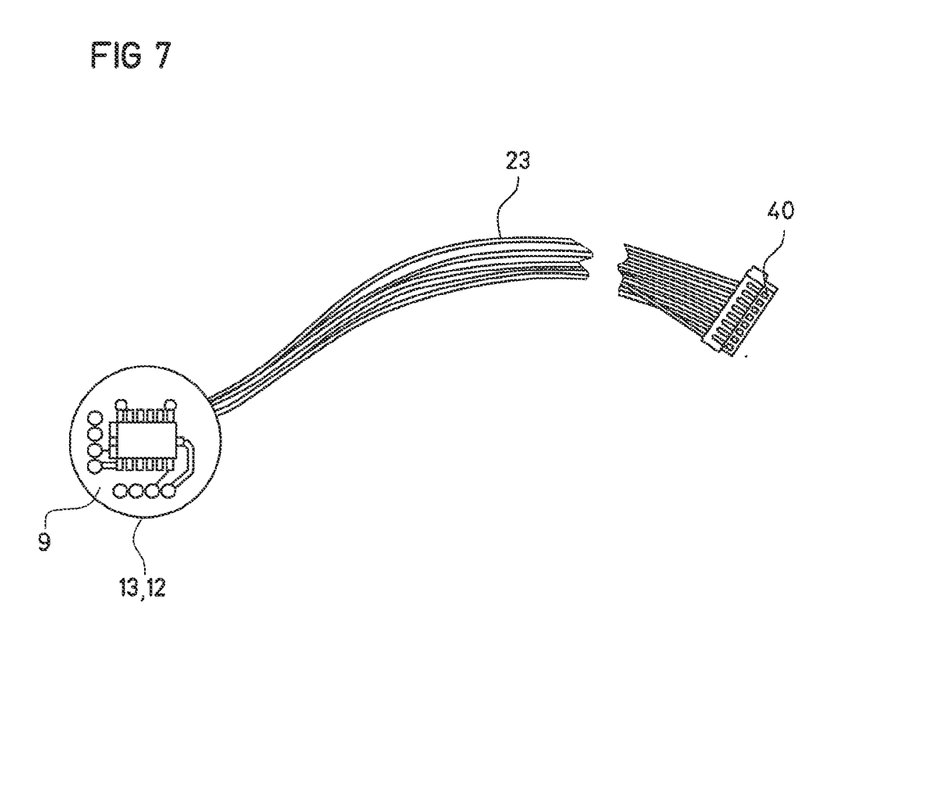
FIG. 7 shows a sensor board with the sensor and with wiring for the tool holder as per FIG. 1.
Figure 8:
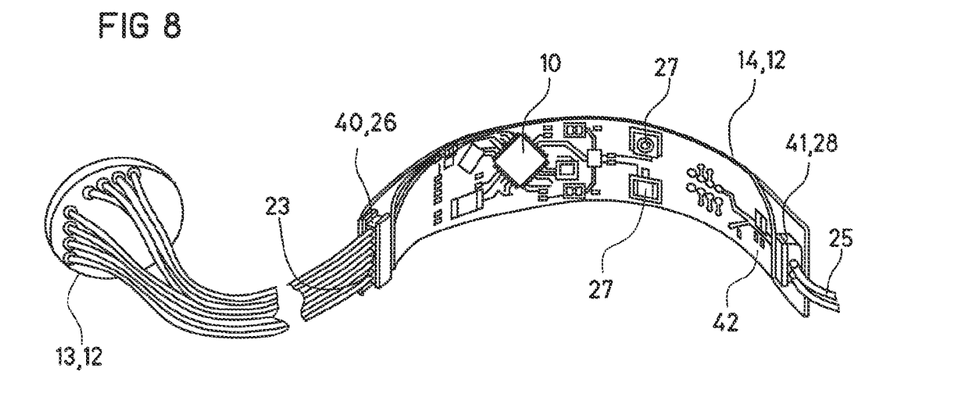
FIG. 8 shows the sensor board with the sensor and the (flexible) main board wired for the tool holder as per FIG. 1.

A major constituent part of the measuring apparatus 8 is, as illustrated in particular in FIGS. 6 to 8, a sensor—in this case, a biaxial acceleration sensor 9, the two measurement axes x and y of which are arranged orthogonally with respect to one another.

Implemented in modular fashion, and in order to be independent of other components of the measuring apparatus 8, this acceleration sensor 9 is located separately on a separate (sensor) board 13 (cf. FIGS. 7 and 8).

In order to keep centrifugal force influences on the acceleration sensor 9 resulting from the rotation of the tool holder 1 as low as possible, the acceleration sensor 9 is, as shown in particular in FIG. 6, located at the central point/on the axis of rotation D in the tool holder 1, wherein the measurement axes x and y (which are orthogonal with respect to one another) are oriented normally with respect to the axis of rotation D (and thus measure radial (32) accelerations in the axial directions x and y) (cf. FIG. 6).

As an alternative to this biaxial acceleration sensor 9, use may also be made of a triaxial acceleration sensor, the—then—three measurement axes x, y, z of which—in this case then—span an orthogonal coordinate system, and the third measurement axis z of which is then oriented axially 31 with respect to the tool holder axis of rotation (D) (not shown).

The (sensor) board 13 is, as is also shown in FIG. 6, adhesively bonded in a housing 39 which can be screwed—instead of the coolant pipe—into the tool holder 1. The acceleration sensor 9 is adhesively bonded directly to the housing 39 by means of instant adhesive.

The connection between the (sensor) board 13 and the main board 14 is, as can be seen in particular from FIG. 8 and FIG. 7, implemented in wired form (connection line 23 for the acceleration sensor 9 with plug connector 40 for a plug contact 26 for the connection line 23). A corresponding plug contact 26 is provided for this, that is to say for the plug connector 40, on the main board 14. It is also possible for wireless connections to be provided between the components instead of the wired connections.

Main Board 14 with Microcontroller (μC) 10

Figure 3:
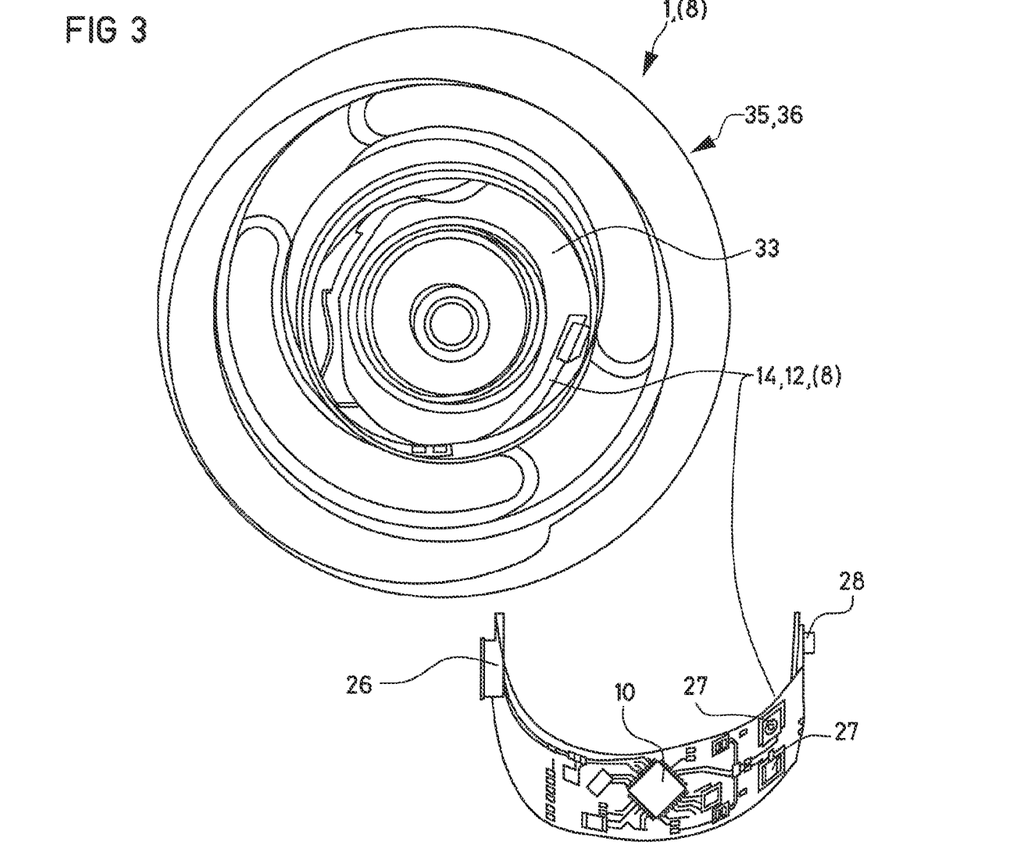
FIG. 3 shows a view of the tool holder as per FIG. 1 with a position of the (flexible) main board.

For the integration of the main board 14, which bears the microcontroller (μC) 10, into the tool holder 1, a circular or ring-shaped groove 33 which is concentric with respect to the axis of rotation D is formed into the tool holder 1, as shown in FIG. 3, which groove 33 runs around the central recess 38 in the tool holder 1 or the region of the coolant pipe (not illustrated here owing to the acceleration sensor).

Figure 2:
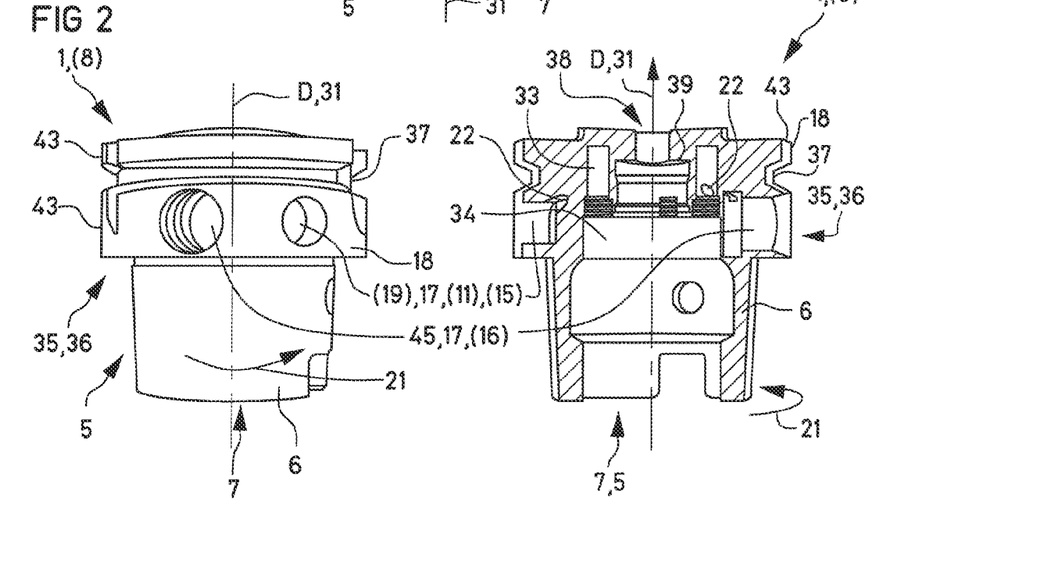
FIG. 2 shows a part of the tool holder as per FIG. 1 with battery compartment and antenna pocket.

The ring-shaped groove 33 is closed, as indicated in FIG. 2, by a cover 34 which can be screwed on, which is advantageous because this area is part of the HSC interface for the ejection of the tool holder 1 from the spindle.

Analogously to the (sensor) board 13 in the sensor housing 39, the main board 14 is potted (19) using a silicone protective coating after all components have been installed in the ring-shaped groove 33.

Figure 4:
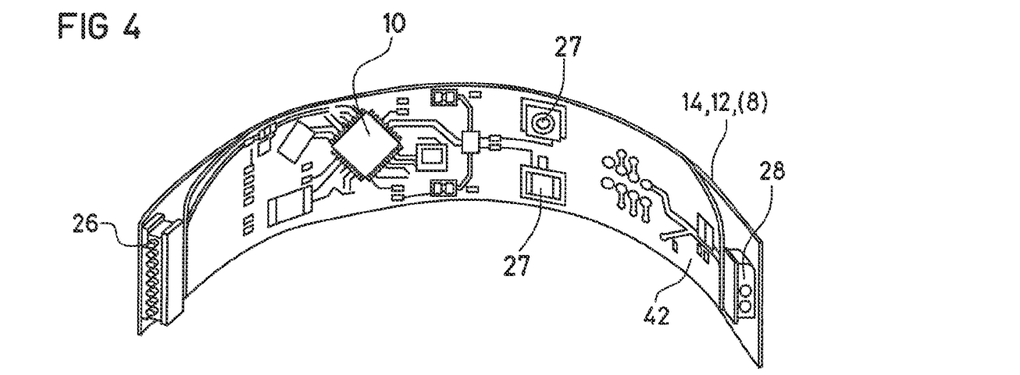
FIG. 4 shows a (flexible) main board with protective foil on the front and rear sides and with a sensor connection, microcontroller (μC) and antenna connection for the tool holder as per FIG. 1.
Figure 5:
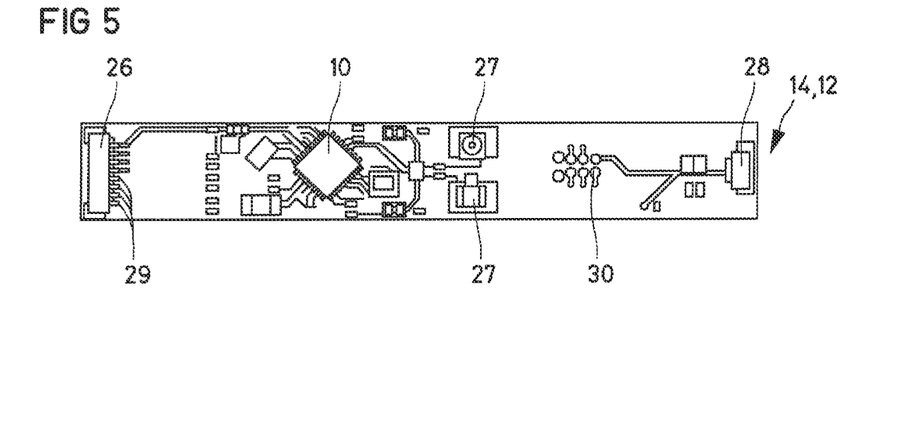
FIG. 5 shows the (flexible) main board with sensor connection (plug contacts), microcontroller (μC), antenna connection, programming contacts and energy supply connection (plug contacts) for the tool holder as per FIG. 1.

As illustrated by FIGS. 3 to 5, the main board 14 is designed as a flexible "strip", because this yields major advantages in particular for the installation process. A flexible board can be adjusted into the shape of the circular groove 33 without great effort (here, cf. also FIG. 3 and FIG. 4) and is easier to handle/install than a rigid variant during the connection of the various connecting lines/cables 23, 24 (not illustrated) 25.

FIG. 5 shows the plan view of the populated main board 14 (without connected lines/cables 23, 24, 25 (cf. FIG. 8)). FIG. 5 shows the top side of the main board 14 on which all components are fitted; only the conductor tracks are present on the rear side of the main board 14.

All connection lines/cables 23, 24 (not illustrated), 25, such as that (23) for the acceleration sensor 9, that (25) for the energy supply 16 and that (24 (not illustrated)) for the antenna 11, are implemented by means of plug contacts 26, 27, 28, which is advantageous for easy and flexible installation.

Situated at the left-hand edge of the main board 14, as shown in FIG. 5, is the connection plug contact 26 for the connection line 23 or the plug connector 40 of the acceleration sensor 9. (Free) contacts 29 situated underneath may be used for further sensor signals if appropriate.

Located slightly to the left of the center of the main board 14 as it is shown in FIG. 5 is the microcontroller (μC) 10 with various components, which microcontroller reads out the signals/data from the acceleration sensor 9.

Signals/data are read out via SPI from the acceleration sensor 9, which—in this case—provides values for the two measurement axes, specifically x and y.

If more than one value is required at a point in time, then it is necessary for all values to be transmitted in one read operation. After a completed read operation, the values from the acceleration sensor 9 are discarded, and the chronologically subsequent values are loaded for the next read operation.

The acceleration sensor 9 transmits the data bytewise, wherein the individual values are each composed of two bytes. Additionally, the acceleration sensor 9 firstly transmits the "rear part" of the overall value, followed by the "front part", which must be put together by the software of the microcontroller (μC) 10. The data are aggregated by the microcontroller (μC) 10 and prepared for transmission.

To the right of the center of the main board 14 as it is shown in FIG. 5, there are two facilities, that is to say plug contacts, for the connection of antennae, of which, in the case of the first tool holder 1, one (in this case the upper plug contact 27) is used for the SMD antenna 11, which transmits (by Bluetooth transmission) signals/data to outside the tool holder 1, for example to a CMS.

Further to the right in the case of the main board 14 as it is shown in FIG. 5, it is possible to see a multiplicity of programming contacts 30, and at the right-hand edge of the main board 14, it is possible to see the connections or the plug contact 28 for the voltage/energy supply 16.

In order to protect the components of the main board 14, the front and rear sides of the main board 14 may if appropriate have a protective foil 42 adhesively bonded thereon, as illustrated in FIG. 4.

SMD Antenna 11

The SMD antenna 11, which is located on the separate antenna board 15 (cf. FIG. 2), is attached to the tool holder 1, as shown in FIGS. 1 and 2, via a circular pocket 17 on the gripper collar 43, which circular pocket is connected via an oblique connecting/connection bore 22 (for the connection line 24 (not illustrated)), which is eccentric in order to prevent kinks in the connection line 24 (not illustrated), to the circular groove 33 that receives the main board 14.

Figure 9:
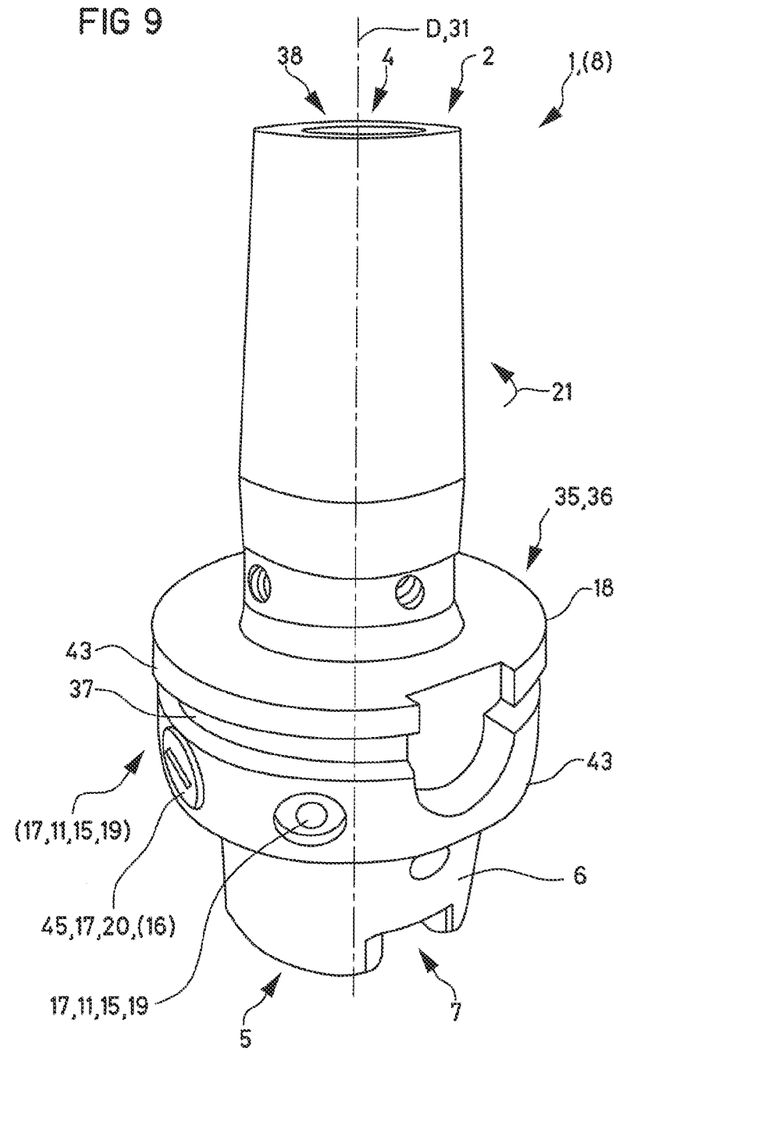
FIG. 9 shows a tool holder with clamping chuck (in this case shrink chuck) according to a further embodiment with two wire antennae.

If appropriate, a second, oppositely situated and identical circular pocket (17) may be formed in the gripper collar (43) in order firstly to improve the quality of balancing of the tool holder 1 and secondly to make it possible to realize other antenna concepts with two antennae (11) (and possibly improved transmission power as a result) (cf. in this case FIG. 9 or tool holder 1 according to the second embodiment with two wire antennae 11). For this purpose, the second antenna connection (in this case further plug contact 27) is already provided on the main board 14 (see above).

For the fastening of the antenna board 15 in the circular pocket 17, said antenna board is potted (19) by means of a silicone (or alternatively covered), or the same silicone protective coating 19 as for the main board 14 may be used.

Energy Supply/Battery 16

The energy/voltage supply 16 or the battery 16 is attached in a similar manner to the SMD antenna 11, as shown in FIGS. 1 and 2, via a further circular pocket 17 (battery compartment 45) on the gripper collar 43, which further circular pocket is—likewise—connected via an oblique connecting bore 22 (for the connection line 25), which is eccentric in order to prevent kinks in the connection line 25, to the circular groove 33 that receives the main board 14.

The battery 16 is fastened in the battery compartment 45 by means of a cover 20 that can be screwed on (cf. FIG. 1) which—capable of being screwed onto the battery compartment 45—closes the latter and simultaneously also produces contact with the battery 16. Said cover 20 also makes it possible for the battery 16 to be exchangeable from the outside.

If appropriate, it is also possible for a seal (not illustrated) to be provided at the battery compartment 45, which seal protects the battery compartment against an ingress of liquid (not shown).

The following is a description of the tool holder 1 with a sensor arrangement, as illustrated in FIG. 9

FIG. 9 shows a further embodiment of a tool holder 1 according to the invention, referred to for short merely as second tool holder 1.

This further or second tool holder 1 differs from that according to the first embodiment, that is to say the first tool holder 1 (cf. FIGS. 1 to 8), merely in that it provides a different type of antenna 11.

Aside from this, this second tool holder 1 also provides the acceleration sensor 9, as in the first embodiment, and also all of the other components, which are however not mentioned in any more detail hereinbelow but have been described in conjunction with the first tool holder 1. More detailed statements in this regard can be found in the statements relating to the first tool holder 1.

By contrast to the first embodiment (here, an SMD antenna 11 has been installed in a circular pocket 17 on the circumference 21 of the first tool holder 1 (cf. FIG. 2)), this second tool holder 1 provides, as shown in FIG. 9, two wire antennae 11 which—in each case likewise arranged in recessed fashion in circular pockets 17—are arranged in uniformly distributed fashion on the circumference 21 of the second tool holder 1. Said wire antennae are also each connected via connection lines/cables to the main board or antenna connections/plug contacts 27 situated thereon.

Here, too, the circular pockets 17, which receive the two wire antennae 11, on the circumference 21 of the tool holder 1 may again be potted by means of a silicone (19) (or alternatively covered).

Figure 12:
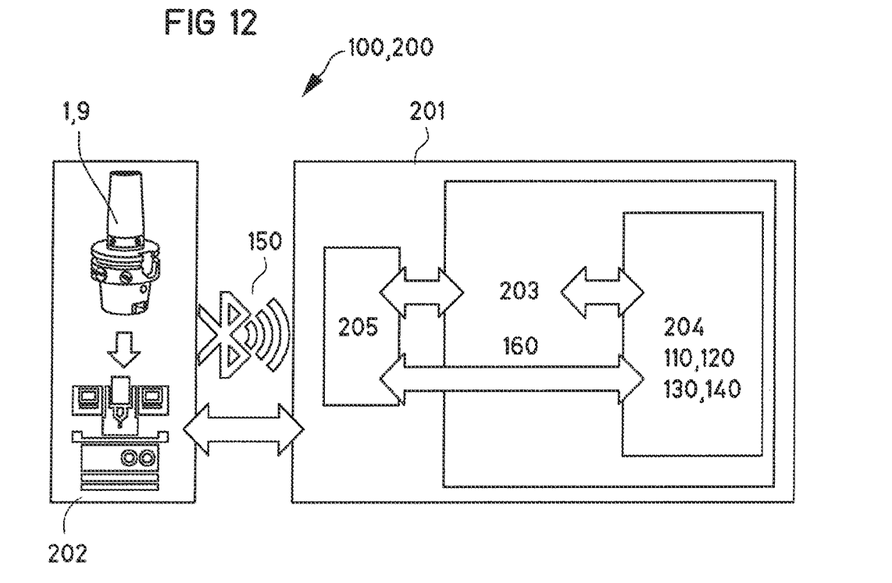
FIG. 12 shows a schematic illustration of a method for monitoring an operating behavior of a tool holder, for example the tool holder according to embodiments mentioned above.
Figure 13:
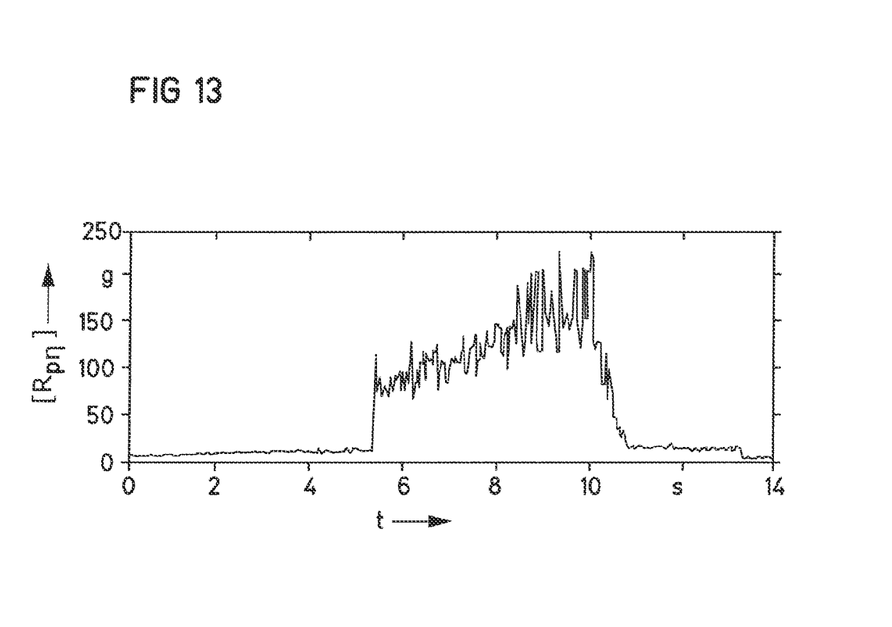
FIG. 13 shows the resultant R of a tool holder according to the invention with a biaxial acceleration sensor with two radial measurement axes over the course of time during a processing process (milling processing)
Figure 14:
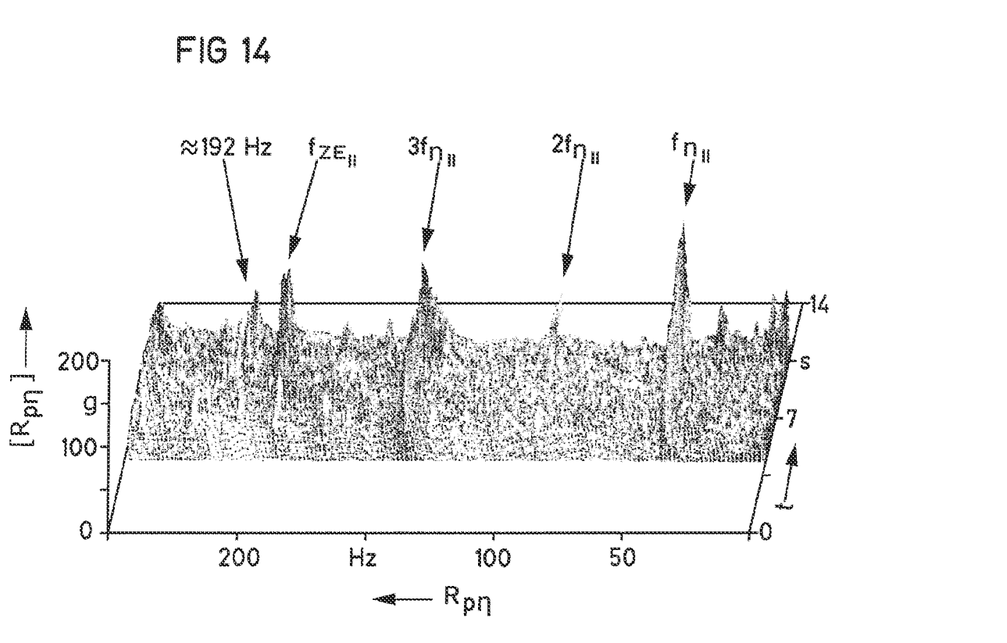
FIG. 14 shows the spectrogram of the resultant R of a tool holder according to the invention with a biaxial acceleration sensor with two radial measurement axes over the course of time during a processing process (milling processing) as per FIG. 13.

The following description deals with a method of condition monitoring of a machine tool or processing machine process by means of a tool holder with a sensor arrangement, as illustrated in FIGS. 12-14.

FIG. 12 is a schematic illustration of a method 100 for monitoring an operating behavior of a tool holder 1 (condition monitoring (CM)), for example the tool holder 1 according to embodiments mentioned above (cf. FIGS. 1 to 9).

FIG. 12 shows this in the form of a (block) diagram of an open-loop/closed-loop control arrangement 203 (as part of the CM or of a CMS 201) of a machine tool 202 (or of some other processing machine) which is implemented with one of the above-described tool holders 1 (and is thus capable of outputting, by means of the acceleration sensor 9, measurement data relating to the processing process).

As stated above and indicated in FIG. 12, the signal transmission 150 of the measurement signals which have been received from the sensor-equipped tool receptacle 1, and which have possibly been pre-processed, takes place via Bluetooth to the CMS 201 or closed-loop control arrangement 203 therein. This allows an ad hoc reaction to incipient and/or still-unsettled instability states, or the compensation of such or similar abnormal process states.

This is performed by means of a real-time adaptation/variation 160 of processing parameters in the machine tool 202, such as feed movement, rotational speed and the like, wherein this adaptation/variation 160 is implemented in a manner dependent on the process states (identified from the measurement signals/data of the sensor-equipped tool holder 1), such as a vibration, chatter or an introduction of force at the tool, wherein the process states are acquired by means of measurement signals/data of the sensor-equipped tool holder 1 and transmitted to the closed-loop control arrangement 203.

The closed-loop control arrangement 203 is composed, as shown in FIG. 12, substantially of a data acquisition and evaluation unit 204, which decides 120 on the process stability (normality/abnormality (process instability))—and possibly varies 160 processing parameters of the machine tool 202 by means of the closed-loop control arrangement 203—if this process stability does not correspond to a specification (normality).

A (Bluetooth) receiver 205 (transceiver), which receives the measurement signals/data from the sensor-equipped tool holder 1, of the CMS 201 is in this case connected via a real-time channel to said data acquisition and evaluation unit 204, thus enabling the real-time capability of the system.

The evaluation unit 204 receives the measurement data from the acceleration sensor 9, which is jointly moved or co-rotates with the tool holder 1, and said evaluation unit stores said measurement data for example in a buffer memory and promptly executes various algorithms, in particular the calculation of the resultant R from the measurement axis signals/data 110, as already described above, for the identification/acquisition of process states 120.

The algorithms used are configured such that it is also specified under what conditions an (automatic) intervention 160 into the open-loop control of the machine tool 202 is performed.

One proportion of the algorithms ascertains process states from the measurement signals/data from the sensor-equipped tool receptacle 1.

Here, in particular, a resultant (R) is calculated from the two measurement axis signals x, y of the biaxial acceleration sensor 9 of the tool holder 1, specifically in accordance with the following rule:

$$R(x_i) = \mathrm{Sqr}(\mathrm{Sum}(x_i^2)) \tag{1}$$

where:

$x_i$ measurement axis signal of the axis i, in this case x and y

Sqr square root

Sum sum.

If the measurement axis signals x, y of the biaxial acceleration sensor 9 of the tool holder 1 are output by a rotating system, these may if appropriate be subjected to a transformation 140, that is to say in this case a coordinate transformation from the rotating system of the tool holder 1 into an inertial system.

If appropriate, it is also possible here for the measurement axis signals to be statistically processed 130, for example smoothed, in order to eliminate measurement errors, measurement value outliers and the like in the measurement axis signals x, y or measurement data.

The evaluation unit 204 then in particular bases its analysis for the identification/acquisition of process states on various representations of the prepared or evaluated measurement axis signals x, y or measurement data, such as in particular the resultant R—over the course of time and as a spectrogram.

FIG. 13 shows, for example, this resultant R of the sensor-equipped tool holder 1 over the course of time in a processing process (milling processing) (abscissa: t (time); ordinate: resultant R or the amplitude thereof (magnitude of the resultant) as a multiple of the normal acceleration g). (A corresponding resultant, or the course thereof, also arises in the case of a transformation into the inertial system, for which reason the "co-rotating data" are to be considered here for the sake of simplicity).

As can be seen from the resultant R (over the course of time), the tooth meshing begins after approximately 0.5 s, and the amplitude, that is to say the value of the resultant R, rises only slightly.

After approximately 5.5 s, an abrupt rise of the resultant R, in this case by approximately 70 g, can be seen, from which an incipient instability, such as chatter, in the process can be inferred.

After approximately 10 s, the feed movement is reduced to v=0 mm/min, until the tool rotates on the spot without moving further (approximately 10.5 s). From this point in time onward, the amplitude or the resultant remains approximately constant, that is to say the process is again in a stable state, until the motor spindle is then completely shut down, or brought to a standstill, after approximately 13.5 s.

FIG. 14 shows a spectrogram, associated with the resultant R as per FIG. 13, of said resultant R. the time axis (in t=seconds) runs here from bottom right to top right; the frequencies (in Hz) increase from bottom right to bottom left.

Here, as shown in FIG. 14, the rotational frequency $f_{nII}$=45 Hz of the processing process, and the multiples thereof, can be seen as being the most significant frequency. The tooth meshing frequency $f_{ZEFII}$=180 Hz can likewise be seen, wherein this always also constitutes a multiple of the rotational frequency.

After approximately 8 s, a further frequency arises in the spectrum at approximately 192 Hz, which can be interpreted as a feature for the unstable process or the chatter (cf. above with regard to FIG. 13).

The resultant R which is used thus provides an informative depiction of the processing process or of the processing states. That is to say, an instability, such as the chatter in this case, can be clearly identified on the basis of said resultant (by the evaluation arrangement 202).

Another proportion of the algorithms then links these process states to processing parameters, for example material parameters and the like and/or user inputs, in order to decide whether an intervention is necessary in the machine tool 202 or in the processing process being carried out thereby.

A further proportion of the algorithms then, if appropriate, adapts the processing parameters on the basis of said data (cf. above—reduction of the feed movement until stability of the processing process is achieved).

Here, the evaluation unit 204 is coupled to the machine tool controller 203 via a real-time channel. An ad hoc adaptation/variation of machine feed movement and/or machine rotational speed and/or the like during the processing is thus made possible.

Typical uses here are the avoidance and/or identification of process errors, process instabilities, chatter, tool breakages, tool wear and so forth.

If a process instability or the like occurs, the processing parameters are varied 160 by means of the machine tool controller 203—automatically and in real time—in reaction thereto.

Although the invention has been illustrated and described in more detail using the preferred exemplary embodiments, the invention is not restricted by the disclosed examples and other variations can be derived therefrom without departing from the scope of protection of the invention.

The following is a summary list of reference numerals and the corresponding structure used in the above description of the invention:

1 Tool holder
2 (First, tool-side) axial longitudinal end
3 Tool section
4 Tool-receiving formation, tool-receiving recess
5 (Second, coupling-side) axial longitudinal end
6 Coupling section
7 Coupling formation
8 Measuring apparatus
9 (Acceleration) sensor
10 Microcontroller (μC)
11 Transmission device, antenna, SMD antenna, wire antenna
12 Circuit board, board
13 (Sensor) board
14 Main board
15 (Antenna) board
16 Energy supply, voltage supply, battery
17 Depression, circular pocket
18 Outer surface
19 Potting compound, silicone compound
20 Lid, cover (for battery compartment)
21 Circumferential direction (of the tool holder (1)), also circumference
22 Connection bore, connecting bore
23 Connection line (for acceleration sensor)
24 Connection line (for transmission device)
25 Connection line (for energy supply)
26 Plug contact(s) for the connection line (for the acceleration sensor)
27 Plug contact(s) for the connection line (for the transmission device)
28 Plug contact(s) for the connection line (for the energy supply)
29 Free plug contacts
30 Programming contacts
31 Axial direction
32 Radial direction
33 Annular/ring-shaped groove
34 Cover (for ring-shaped groove)
35 (Tool holder) main body
36 Handling formation
37 Gripper channel
38 Central recess
39 Housing (for the (sensor) board 13)
40 Plug connector (for the plug contact for the connection line (for the (acceleration) sensor))
41 Plug connector (for the plug contact for the connection line (for the energy supply))
42 Protective film
43 Gripper collar
44 Handling formation, gripper apparatus
45 Battery compartment
100 Method
110 Formation of the resultant measurement axis signal or of the resultant R using the at least two measurement axis signals (x, y)
120 Monitoring/identification/assessment (of process conditions) using the resultant R
130 Statistical processing
140 Transformation, coordinate transformation
150 Transmission (via an SPI interface)
160 Adaptation/variation of operating parameters
200 Intelligent tool holder
201 CMS
202 Machine tool, processing machine
203 Closed-loop control arrangement/open-loop control arrangement (CMS)
204 Evaluation unit (CMS)
205 Receiver
R Resultant
D Tool holder axis of rotation, axis of rotation
x Measurement axis, measurement axis signal
y Measurement axis, measurement axis signal
z Measurement axis, measurement axis signal
ZEF Central meshing frequency
$f_{nII}$ Rotational frequency
$f_{ZEFII}$ Tooth meshing frequency

The invention claimed is:

1. A method of monitoring an operating behavior of a tool holder, the method which comprises:
providing a tool holder configured for rotation about a tool holder axis of rotation defining an axial direction, the tool holder, at one axial longitudinal end thereof, having a tool section with a tool-receiving formation for receiving a tool and, at another axial longitudinal end thereof, having a coupling section with a coupling formation for a torque-transmitting coupling to a machine spindle of a machine tool, the tool holder further having a measuring apparatus for acquiring data relating to an operation of the tool holder, the measuring apparatus being a sensor with at least two measurement axes that are oriented substantially radially with respect to the tool holder axis of rotation;
  outputting by the sensor at least two measurement axis signals associated with the at least two measurement axes;
  calculating a resultant R, being a resultant measurement axis signal, using the at least two measurement axis signals; and
  monitoring the operating behavior of the tool holder using the resultant R.

2. The method according to claim 1, wherein the sensor is an acceleration sensor having at least two acceleration measurement axes.

3. The method according to claim 1, which comprises calculating the resultant R in accordance with the following rule:

$$R(x_i) = \mathrm{Sqr}(\mathrm{Sum}(x_i^2))$$

where:
  $x_i$ measurement axis signal of an axis i
  Sqr square root
  Sum sum.

4. The method according to claim 3, wherein the formula is vectorial in a case in which the sensors are non-orthogonally oriented sensors.

5. The method according to claim 1, which comprises:
  providing a sensor with a third measurement axis, the third measurement axis being oriented substantially axially with respect to the tool holder axis of rotation;
  outputting by the sensor a third measurement axis signal associated with a third measurement axis; and
  calculating the resultant including the third measurement axis signal, and/or separately evaluating the third measurement axis signal.

6. The method according to claim 1, which comprises wirelessly transmitting unprocessed or processed measurement axis signals and/or data to an evaluation unit.

7. The method according to claim 6, wherein the evaluation unit belongs to a condition monitoring system.

8. The method according to claim 6, which comprises statistically processing the unprocessed or processed measurement axis signals and/or data, by smoothing, filtering, or subjecting to a frequency analysis.

9. The method according to claim 6, which comprises subjecting the unprocessed or processed measurement axis signals and/or data to a coordinate transformation from a rotary system into an inertial system.

10. The method according to claim 6, which comprises transmitting the signals and/or data via an SPI interface.

11. The method according to claim 1, wherein the sensor is arranged in the tool holder axis of rotation or in close vicinity to the tool holder axis of rotation.

12. The method according to claim 1, which comprises automatically adapting and/or varying process parameters and/or operating parameters of a machine tool that is in a processing operation with the tool holder in dependence on the monitoring.

13. The method according to claim 1, wherein the tool holder includes further electronics components selected from the group consisting of a microcontroller, one or more transmission devices, one or more antennae, one or more circuit boards, and one or more energy supplies.

14. The method according to claim 1, wherein:
  the tool-receiving formation is a device selected from the group consisting of a shrink chuck, a hydraulic expansion chuck, a face mill arbor, a collet chuck, and a power chuck: and/or wherein
  the coupling formation comprises a hollow shaft cone or a steep-angle taper and/or an engagement formation for a ball-type clamping system.

15. The method according to claim 1, which comprises using an analysis of the resultant for identifying an abnormal operating/process state.

16. The method according to claim 15, which comprises identifying at least one abnormality selected from the group consisting of an instability, a chatter, wear, and breakage in or of a tool received in the tool holder.

17. The method according to claim 1, which comprises identifying an eccentricity by analyzing a base load $a_{zp}$.

18. The method according to claim 1, which comprises automatically adapting or varying an automatic machine tool control, with process and/or operating parameters of the machine tool that is in a processing process/operation with the tool holder in dependence on the monitoring.

19. An intelligent tool holder, comprising:
  at least one tool holder that is configured for rotation about a tool holder axis of rotation defining an axial direction, said tool holder, at one axial longitudinal end thereof, having a tool section with a tool-receiving formation for receiving a tool and, at another axial longitudinal end thereof, having a coupling section with a coupling formation for torque-transmitting coupling to a machine spindle of a machine tool;
  a measuring apparatus for acquiring data relating to an operation of said tool holder, said measuring apparatus being a sensor with at least two measurement axes that are oriented substantially radially with respect to the tool holder axis of rotation, said sensor being configured to output at least two measurement axis signals assigned to the at least two measurement axes; and
  an evaluation unit being configured to calculate a resultant R, being a resultant measurement axis signal, using the at least two measurement axis signals, and said evaluation unit being configured to monitor the operating behavior of the tool holder using the resultant R.

20. The intelligent tool holder according to claim 19, wherein said sensor is an acceleration sensor with two or more measurement axes.

* * * * *